(12) United States Patent
Fu et al.

(10) Patent No.: US 10,026,525 B2
(45) Date of Patent: Jul. 17, 2018

(54) THREADED REFLECTIVE CORD AND MANUFACTURING METHOD THEREOF

(71) Applicants: DONGGUAN YINGTONG WIRE CO., LTD., Dongguan, Guangdong (CN); HUBEI YINGTONG ELECTRONICS CO., LTD., Xianning, Hubei (CN)

(72) Inventors: Hualiang Fu, Guangdong (CN); Xiang Wei, Guangdong (CN)

(73) Assignees: DONGGUAN YINGTONG WIRE CO., LTD, Dongguan (CN); HUBEI YINGTONG ELECTRONIC CO., LTD, Xianning (CN)

( * ) Notice: Subject to any disclaimer, the term of this patent is extended or adjusted under 35 U.S.C. 154(b) by 0 days.

(21) Appl. No.: 15/112,192

(22) PCT Filed: Nov. 20, 2014

(86) PCT No.: PCT/CN2014/091768
§ 371 (c)(1),
(2) Date: Jul. 18, 2016

(87) PCT Pub. No.: WO2016/033876
PCT Pub. Date: Mar. 10, 2016

(65) Prior Publication Data
US 2016/0343468 A1    Nov. 24, 2016

(30) Foreign Application Priority Data
Sep. 5, 2014   (CN) .......................... 2014 1 0452861

(51) Int. Cl.
*H01B 13/14*     (2006.01)
*H01B 7/02*      (2006.01)
(Continued)

(52) U.S. Cl.
CPC ........... *H01B 7/0275* (2013.01); *C09D 5/004* (2013.01); *C09D 7/61* (2018.01); *C09D 7/63* (2018.01);
(Continued)

(58) Field of Classification Search
CPC .............................. H01B 13/14; H01B 7/0275
(Continued)

(56) References Cited

U.S. PATENT DOCUMENTS 3,865,972 A * 2/1975 Norris ...................... H01B 9/00
                                                        174/115
4,605,818 A * 8/1986 Arroyo ................. G02B 6/4436
                                                        156/54
(Continued)

FOREIGN PATENT DOCUMENTS

CN             201886811     *  6/2011    ............... H01B 7/17

*Primary Examiner* — Hoa C Hguyen
*Assistant Examiner* — Stanley Tso

(57) ABSTRACT

A threaded reflective cord comprises a jacket and an inner cord; the inner cord comprising more than two stranded wires twisted helically and an cladding covered on the wire strands; wherein the cladding having an inner side thereof is embedded into a helical gap which is formed when the stranded wires are twisted helically; the helical gap forms and keeps an inward pre-tightening force on the stranded wires, the jacket and the inner cord having a reflective tape disposed therebetween, the reflective tape being spirally wounded on an outer side of the cladding; the jacket having an inner side thereof is coated on the cladding and embedded into a helical groove which is formed when the reflective tape is spirally wounded on the outer side of the cladding; the flexural resistance of the threaded reflective cord and the reflection performance are enhanced.

5 Claims, 2 Drawing Sheets

FIG. 1

(51) Int. Cl.
*H01B 13/24* (2006.01)
*C09D 5/33* (2006.01)
*C09D 7/61* (2018.01)
*C09D 7/63* (2018.01)
*C09D 7/65* (2018.01)
*C09D 7/40* (2018.01)
*H01B 7/36* (2006.01)

(52) U.S. Cl.
CPC ................ *C09D 7/65* (2018.01); *C09D 7/70* (2018.01); *H01B 7/0216* (2013.01); *H01B 7/366* (2013.01); *H01B 13/24* (2013.01); *H01B 7/361* (2013.01)

(58) Field of Classification Search
USPC ..................................................... 174/113 A
See application file for complete search history.

(56) References Cited

U.S. PATENT DOCUMENTS

| | | | |
|---|---|---|---|
| 2014/0102749 A1* | 4/2014 | Varkey .................. | H01B 7/046 174/102 R |
| 2015/0170797 A1* | 6/2015 | Perez-Sanchez et al. ....... | H01B 7/366 174/113 R |
| 2015/0179307 A1* | 6/2015 | Ranganathan ........... | H01B 7/36 174/113 R |
| 2015/0214746 A1* | 7/2015 | Lopez Gomez ....... | H01B 13/02 307/11 |

* cited by examiner

THREADED REFLECTIVE CORD AND MANUFACTURING METHOD THEREOF

CROSS-REFERENCE TO RELATED APPLICATION

This application claims priority to PCT Application No.: PCT/CN2014/091768, having a filing date of Nov. 20, 2014, based off of Chinese Application No.: 201410452861.3, having a filing date of Sep. 5, 2014, the entire contents of which are hereby incorporated by reference.

FIELD OF THE INVENTION

The present invention relates to a cord, particularly to a threaded reflective cord and manufacturing method thereof.

BACKGROUND OF THE INVENTION

For the existing reflective earphone cord, the reflector material is added in the component of jacket directly for overall reflection. However, this method has the following deficiencies: 1) poor reflection performance, and the performance of jacket is influenced; 2) overall luminescence is available only, spaced luminous thread cannot be made as required; 3) general reflector material has poor affinity for skin, if it contacts human body directly, the comfort of earphone cord is degraded. In addition, the bending performance and surface touch of traditional earphone cords shall be improved.

SUMMARY OF INVENTION

The objective of the present invention is to solve the above-mentioned problems and provide a threaded reflective cord and manufacturing method. The technical scheme is to provide a threaded reflective cord comprising: a jacket and an inner cord; the inner cord comprising more than two stranded wires twisted helically and an cladding covered on the wire strands; wherein the cladding having an inner side thereof is embedded into a helical gap which is formed when the stranded wires are twisted helically; the helical gap forms and keeps an inward pre-tightening force on the stranded wires, so that every contact surfaces of insulations between the stranded wires are bonded tightly and deformed; wherein the jacket is a transparent jacket, the transparent jacket and the inner cord having a reflective tape disposed therebetween, the reflective tape being spirally wounded on an outer side of the cladding; the jacket having an inner side thereof is coated on the cladding and embedded into a helical groove which is formed when the reflective tape is spirally wounded on the outer side of the cladding; the helical groove forms and keeps the inward pre-tightening force on the reflective tape; wherein the transparent jacket is formed as a thread-like roughness disposed at an outer surface thereof.

More particularly, wherein the thread-like roughness formed on the outer surface of the jacket is rounded off.

More particularly, wherein a sag of the thread-like roughness formed on the outer surface of the jacket corresponds to the helical groove being formed when the reflective tape is spirally wounded on the outer side of the cladding.

More particularly, wherein the stranded wire comprises the insulation and a plain conductor, and yarns.

More particularly, wherein a width of the reflective tape is 0.2-1 time of a pitch of spiral winding on the outer side of the cladding.

More particularly, wherein the reflective tape comprises a tape body and a reflective coating formed on the tape body.

More particularly, wherein the reflective coating consists of the following parts of components by weight:
acrylic resin 20-25,
benzene emulsion with 50% solid content 60-70,
butylbenzene emulsion with 50% solid content 20-30,
titanium pigment 10-12,
aluminum powder 3-5,
1000-1200 mesh glass microballoon 8-10,
sodium tripolyphosphate 0.2-0.3,
tributyl phosphate 0.3-0.5,
polyvinyl alcohol (PVA) 0.8-1,
water 15-20.

A manufacturing method for the threaded reflective cord, the method comprising: preparing an inner cord: twisting helically more than two stranded wires, forming a cladding on an outer side of the stranded wires and embedding an inner side of the cladding into a helical gap by thermoforming, wherein the helical gap is formed when the stranded wires are twisted helically; the helical gap forms and keeps an inward pre-tightening force on the stranded wires, so that every contact surfaces of insulations between the stranded wires are bonded tightly and deformed; winding a reflective tape: producing a reflective coating on a tape body to form a reflective tape, and then spirally winding an outer side of the cladding with the reflective tape; preparing a transparent jacket: extruding the transparent jacket out of a machine, coating the cladding with the transparent jacket, and embedding an inner side of the transparent jacket into a helical groove by thermoforming; wherein the helical groove is formed when the reflective tape is spirally wounded on the outer side of the cladding.

More particularly, wherein a preparing method of the reflective coating comprise two steps of: (1) weighing out the following parts of components by weight:
acrylic resin 20-25,
benzene emulsion with 50% solid content 60-70,
butylbenzene emulsion with 50% solid content 20-30,
titanium pigment 10-12,
aluminum powder 3-5,
800-1000 mesh glass microballoon 8-10,
sodium tripolyphosphate 0.2-0.3,
tributyl phosphate 0.3-0.5,
PVA 0.8-1,
water 15-20;
(2) premixing the acrylic resin, titanium pigment, aluminum powder, sodium tripolyphosphate, tributyl phosphate, PVA into the water, grinding into 800-1000 mesh slurry, mixing with the benzene emulsion, butylbenzene emulsion and glass microballoon uniformly in the slurry mixer, and adjusting the viscosity and filtering to form the reflective coating.

More particularly, wherein the titanium pigment is composed of the following percentages of components by weight: phosphoric acid 6%; NaHCO3 1%; calcium bicarbonate 1%; TiO2 92%.

The present invention has the following advantages:

First, the inner cord is made of multiple single wires which are twisted helically, and the cladding is tightened by thermoplastic deformation, generating pretightening force to extrude multiple single wires, so that the wires are compacted, the flexural resistance of earphone cord is enhanced. Second, the reflective tape is wound spirally between the transparent jacket and inner cord to form the reflective part. The reflective tape is protected well while the helical reflection is implemented, not contacting human body. Further-more, as the reflective tape has a certain thickness, there is spiral rough sense after cladding thermoplastic of transparent jacket, the touch of earphone cord is enhanced. Third, the new reflective coating enhances the reflection performance.

The technical scheme of the present invention is summarized above, the present invention is further described by attached figures and specific implementation in the following text.

DETAILED DESCRIPTION OF THE PREFERRED EMBODIMENTS

Embodiment 1

Figure 1:
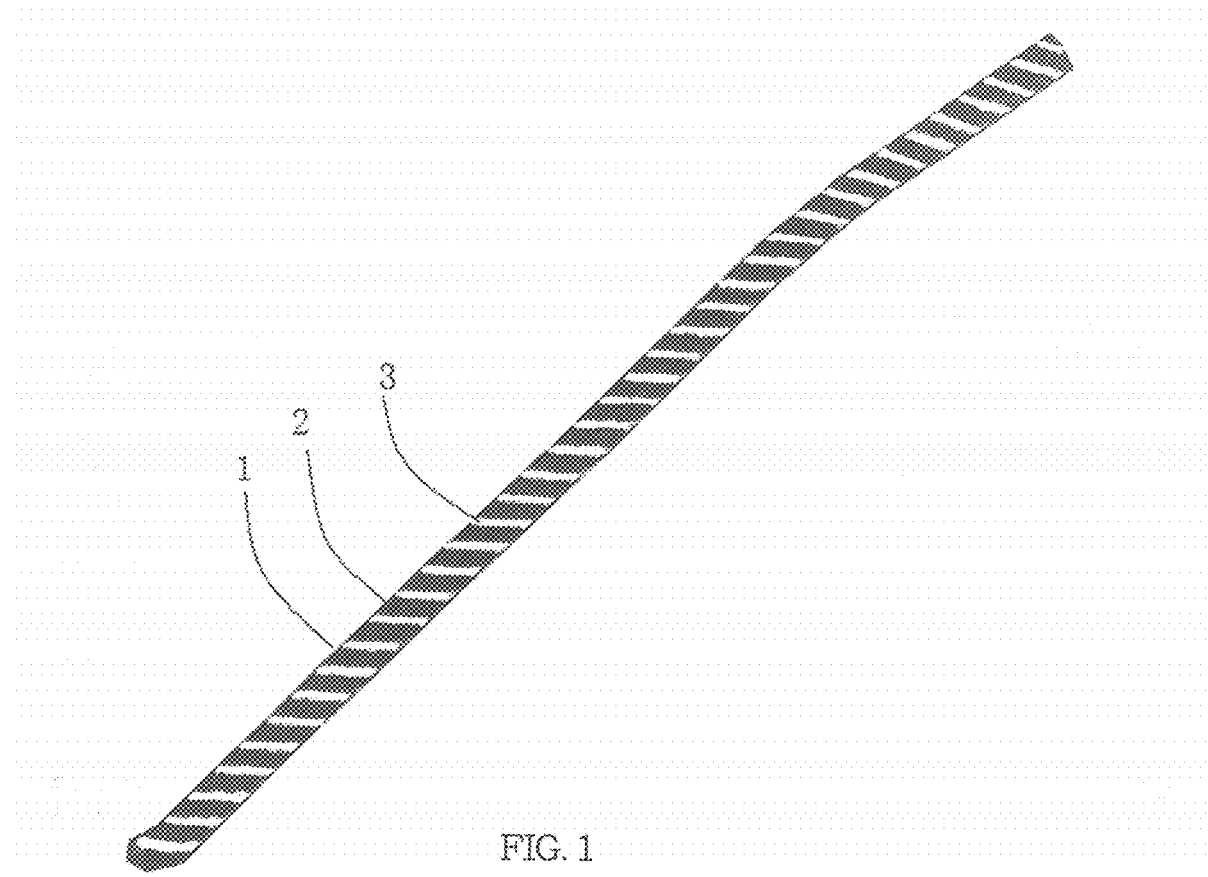
FIG. 1 is a schematic view of a first structure of the present invention.
Figure 2:
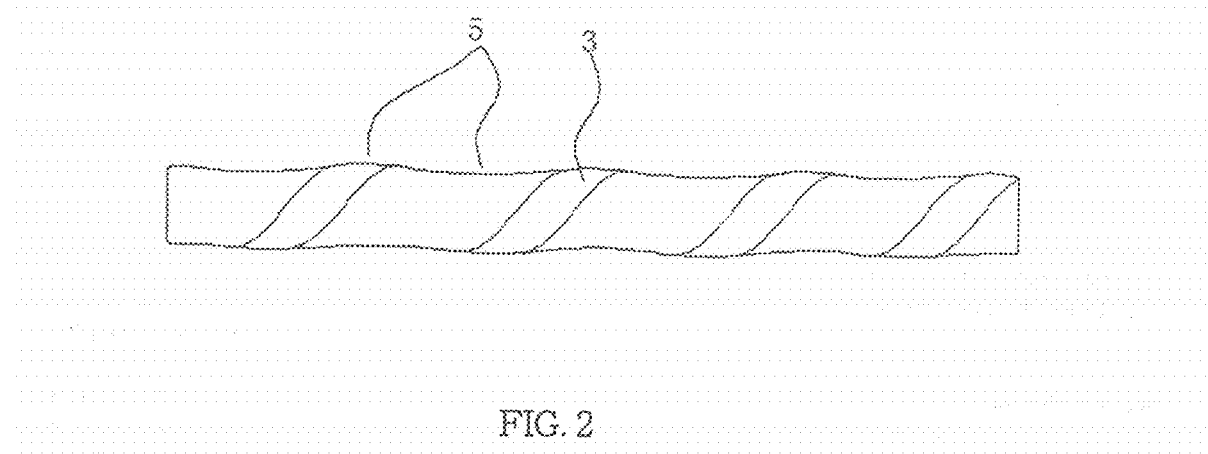
FIG. 2 is a schematic view of a second structure of the present invention.
Figure 3:
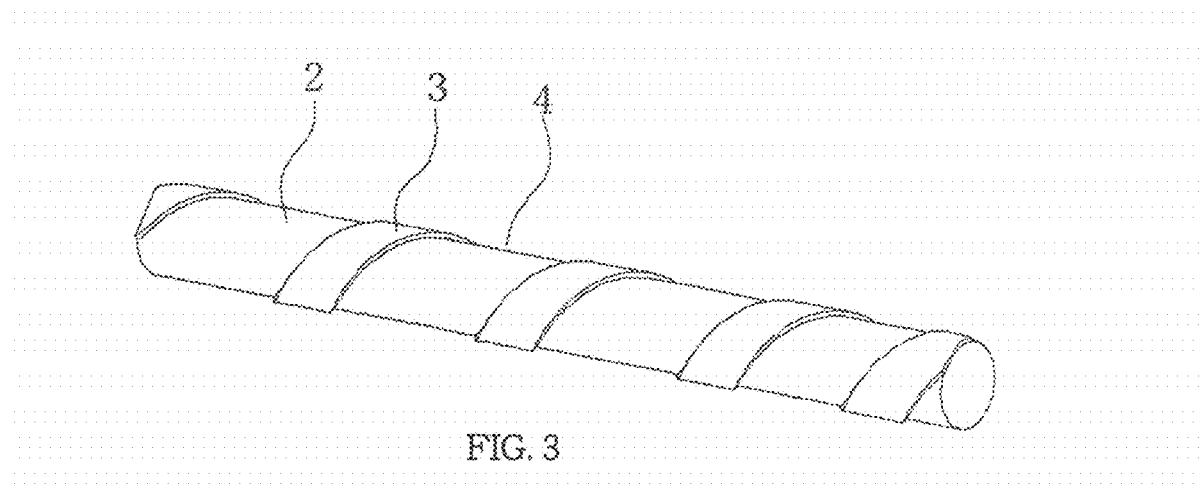
FIG. 3 is a schematic view of a threaded reflective cord removed a jacket of the present invention.
Figure 4:
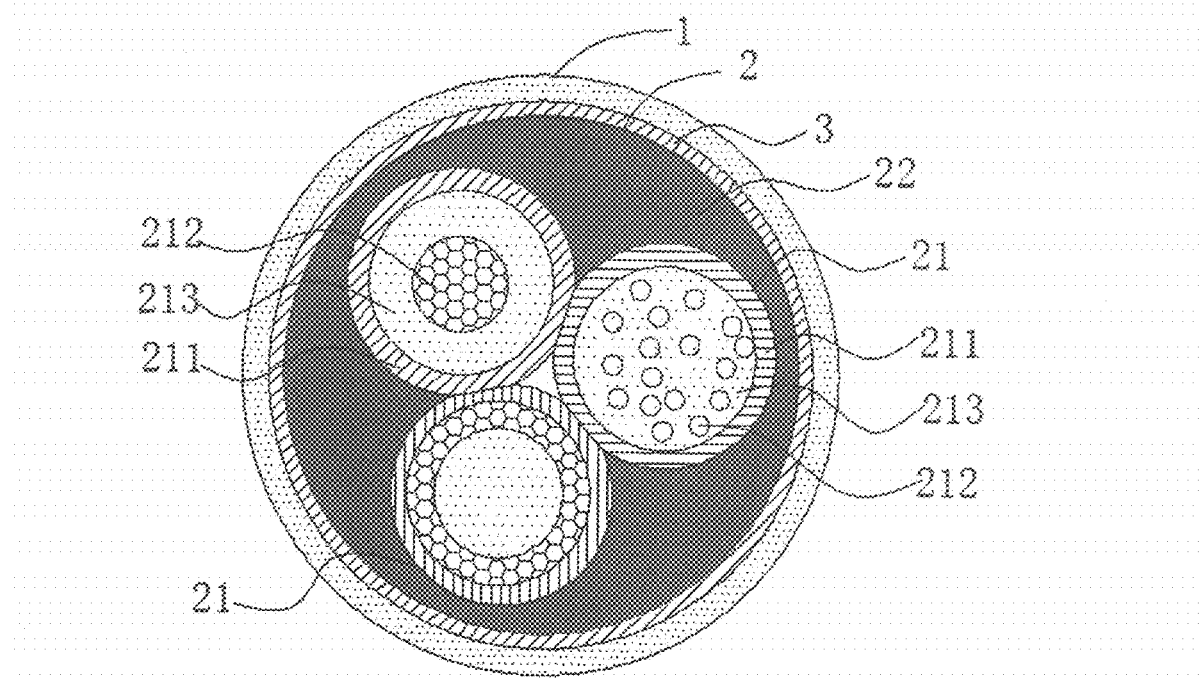
FIG. 4 is a sectional view of the threaded reflective cord.

Referring to FIGS. 1-4, a threaded reflective cord comprises a jacket (1) and an inner cord (2); the inner cord (2) comprising more than two stranded wires (21) twisted helically and an cladding (22) covered on the wire strands;

wherein the cladding (22) having an inner side thereof is embedded into a helical gap which is formed when the stranded wires (21) are twisted helically; the helical gap forms and keeps an inward pre-tightening force on the stranded wires (21), so that every contact surfaces of insulations (211) between the stranded wires (21) are bonded tightly and deformed;

wherein the jacket (1) is a transparent jacket, the transparent jacket and the inner cord (2) having a reflective tape (3) disposed therebetween, the reflective tape (3) being spirally wounded on an outer side of the cladding (22); the jacket (1) having an inner side thereof is coated on the cladding (22) and embedded into a helical groove (4) which is formed when the reflective tape (3) is spirally wounded on the outer side of the cladding (22); the helical groove (4) forms and keeps the inward pre-tightening force on the reflective tape (3); wherein the transparent jacket is formed as a thread-like roughness (5) disposed at an outer surface thereof.

Wherein the thread-like roughness (5) formed on the outer surface of the jacket (1) is rounded off.

Wherein a sag of the thread-like roughness (5) formed on the outer surface of the jacket (1) corresponds to the helical groove (4) being formed when the reflective tape (3) is spirally wounded on the outer side of the cladding (22).

The threaded reflective cord according to claim 1, wherein the stranded wire (21) comprises the insulation (211) and a plain conductor (213), and yarns (212).

Wherein a width of the reflective tape (3) is 0.2-1 time of a pitch of spiral winding on the outer side of the cladding (22).

Wherein the reflective tape (3) comprises a tape body and a reflective coating formed on the tape body.

Wherein the reflective coating consists of the following parts of components by weight:

acrylic resin 20-25, benzene emulsion with 50% solid content 60-70, butylbenzene emulsion with 50% solid content 20-30, titanium pigment 10-12, aluminum powder 3-5, 1000-1200 mesh glass microballoon 8-10, sodium tripolyphosphate 0.2-0.3, tributyl phosphate 0.3-0.5, polyvinyl alcohol (PVA) 0.8-1, water 15-20.

A manufacturing method for the above mentioned threaded reflective cord comprises:

preparing an inner cord (2): twisting helically more than two stranded wires (21), forming a cladding (22) on an outer side of the stranded wires (21) and embedding an inner side of the cladding (22) into a helical gap by thermoforming, wherein the helical gap is formed when the stranded wires (21) are twisted helically; the helical gap forms and keeps an inward pre-tightening force on the stranded wires (21), so that every contact surfaces of insulations (211) between the stranded wires (21) are bonded tightly and deformed;

winding a reflective tape: producing a reflective coating on a tape body to form a reflective tape, and then spirally winding an outer side of the cladding (22) with the reflective tape (3);

preparing a transparent jacket (1): extruding the transparent jacket (1) out of a machine, coating the cladding (22) with the transparent jacket (1), and embedding an inner side of the transparent jacket (1) into a helical groove (4) by thermoforming; wherein the helical groove (4) is formed when the reflective tape is spirally wounded on the outer side of the cladding (22).

Wherein a preparing method of the reflective coating comprise two steps of:

(1.1) weighing out the following parts of components by weight:

acrylic resin 20-25,

Benzene emulsion with 50% solid content 60-70,

Butylbenzene emulsion with 50% solid content 20-30,

Titanium pigment 10-12,

Aluminum powder 3-5, 800-1000 mesh glass microballoon 8-10,

Sodium tripolyphosphate 0.2-0.3,

Tributyl phosphate 0.3-0.5,

PVA 0.8-1,

Water 15-20;

(1.2) premixing the acrylic resin, titanium pigment, aluminum powder, sodium tripolyphosphate, tributyl phosphate, PVA into the water, grinding into 800-1000 mesh slurry, mixing with the benzene emulsion, butylbenzene emulsion and glass microballoon uniformly in the slurry mixer, and adjusting the viscosity and filtering to form the reflective coating.

wherein the titanium pigment is composed of the following percentages of components by weight: phosphoric acid 6%; NaHCO3 1%; calcium bicarbonate 1%; TiO2 92%.

Embodiment 2

This embodiment is basically identical with Embodiment 1, the difference is that the preparation of reflective coating consists of the following steps:

(2.1) Weighing out the following parts of components by weight:
Acrylic resin 20,
Benzene emulsion with 50% solid content 60,
Butylbenzene emulsion with 50% solid content 20,
Titanium pigment 10,
Aluminum powder 3,
800 mesh glass microballoon 8,
Sodium tripolyphosphate 0.2,
Tributyl phosphate 0.3,
PVA 0.8,
Water 15, (2.2) The acrylic resin, titanium pigment, aluminum powder, sodium tripolyphosphate, tributyl phosphate, PVA and water are premixed, ground into 800 mesh slurry, mixed with benzene emulsion, butylbenzene emulsion and glass microballoon uniformly in the slurry mixer, the viscosity is adjusted, filtered to form the reflective coating.

The titanium pigment is composed of the following percentages of components by weight: phosphoric acid 6%; NaHCO3 1%; calcium bicarbonate 1%; TiO2 92%.

Embodiment 3

This embodiment is basically identical with Embodiment 1, the difference is that the preparation of reflective coating consists of the following steps:

(3.1) Weigh out the following parts of components by weight:
Acrylic resin 25,
Benzene emulsion with 50% solid content 70,
Butylbenzene emulsion with 50% solid content 30,
Titanium pigment 12,
Aluminum powder 5,
1000 mesh glass microballoon 10,
Sodium tripolyphosphate 0.3,
Tributyl phosphate 0.5,
PVA 1,
Water 20;

(3.2) The acrylic resin, titanium pigment, aluminum powder, sodium tripolyphosphate, tributyl phosphate, PVA and water are premixed, ground into 1000 mesh slurry, mixed with benzene emulsion, butylbenzene emulsion and glass microballoon uniformly in the slurry mixer, the viscosity is adjusted, filtered to form the reflective coating.

The titanium pigment is composed of the following percentages of components by weight: phosphoric acid 6%; NaHCO3 1%; calcium bicarbonate 1%; TiO2 92%.

Embodiment 4

The preparation of reflective coating consists of the following steps:

(4.1) Weigh out the following parts of components by weight:
Acrylic resin 23,
Benzene emulsion with 50% solid content 65,
Butylbenzene emulsion with 50% solid content 25,
Titanium pigment 11,
Aluminum powder 4,
900 mesh glass microballoon 9,
Sodium tripolyphosphate 0.4,
Tributyl phosphate 0.9,
PVA 0.9,
Water 18;

(4.2) The acrylic resin, titanium pigment, aluminum powder, sodium tripolyphosphate, tributyl phosphate, PVA and water are premixed, ground into 900 mesh slurry, mixed with benzene emulsion, butylbenzene emulsion and glass microballoon uniformly in the slurry mixer, the viscosity is adjusted, filtered to form the reflective coating.

The titanium pigment is composed of the following percentages of components by weight: phosphoric acid 6%; NaHCO3 1%; calcium bicarbonate 1%; TiO2 92%.

The present invention is not limited to the aforesaid implementation modes, any other thread reflective cords and preparation methods obtained by using the structures, materials and methods identical with or similar to the aforesaid embodiments of the present invention are within the protective range of the present invention.

We claim:

1. A threaded reflective cord comprising:
a jacket and an inner cord; the inner cord comprising more than two stranded wires twisted helically and a cladding covered on the wire strands;
wherein the cladding having an inner side thereof is embedded into a helical gap which is formed when the stranded wires are twisted helically; the helical gap forms and keeps an inward pre-tightening force on the stranded wires, so that every contact surfaces of insulations between the stranded wires are bonded and deformed;
wherein the jacket is a transparent jacket, the transparent jacket and the inner cord having a reflective tape disposed therebetween, the reflective tape being spirally wound on an outer side of the cladding; the jacket having an inner side thereof is coated on the cladding and embedded into a helical groove which is formed when the reflective tape is spirally wound on the outer side of the cladding; the helical groove forms and keeps the inward pre-tightening force on the reflective tape;
wherein the transparent jacket is formed as a threaded concave-convex surface disposed at an outer surface thereof;
wherein the reflective tape comprises a tape body and a reflective coating formed on the tape body;
wherein the reflective coating consists of the following parts of components by weight:
acrylic resin 20-25,
benzene emulsion with 50% solid content 60-70,
butylbenzene emulsion with 50% solid content 20-30,
titanium pigment 10-12,
aluminum powder 3-5,
1000-1200 mesh glass microballoon 8-10,
sodium tripolyphosphate 0.2-0.3,
tributyl phosphate 0.3-0.5,
polyvinyl alcohol (PVA) 0.8-1,
water 15-20.

2. The threaded reflective cord according to claim 1, wherein the threaded concave-convex surface formed on the outer surface of the jacket is rounded off.

3. The threaded reflective cord according to 1, wherein a sag of the threaded concave-convex surface formed on the outer surface of the jacket corresponds to the helical groove being formed when the reflective tape is spirally wound on the outer side of the cladding.

4. The threaded reflective cord according to claim 1, wherein the stranded wire comprises the insulation, and a plain conductor, and yarns.

5. The threaded reflective cord according to claim 1, wherein a width of the reflective tape is 0.2-1 times of a pitch of spiral winding on the outer side of the cladding.

* * * * *